(12) United States Patent
Jayakar (10) Patent No.: US 11,858,450 B2
(45) Date of Patent: Jan. 2, 2024

(54) ROOF-MOUNTED OCCUPANT RESTRAINT SYSTEM

(71) Applicant: ZF Passive Safety Systems US Inc., Washington, MI (US)

(72) Inventor: Hylus Ranjit Raj Jayakar, Shelby Township, MI (US)

(73) Assignee: ZF PASSIVE SAFETY SYSTEMS US INC., Washington, MI (US)

(*) Notice: Subject to any disclaimer, the term of this patent is extended or adjusted under 35 U.S.C. 154(b) by 377 days.

(21) Appl. No.: 17/044,353

(22) PCT Filed: Dec. 5, 2018

(86) PCT No.: PCT/US2018/063951
§ 371 (c)(1),
(2) Date: Oct. 1, 2020

(87) PCT Pub. No.: WO2019/209378
PCT Pub. Date: Oct. 31, 2019

(65) Prior Publication Data
US 2021/0102865 A1 Apr. 8, 2021
US 2021/0389210 A9 Dec. 16, 2021

Related U.S. Application Data

(60) Provisional application No. 62/661,667, filed on Apr. 24, 2018.

(51) Int. Cl.
*B60R 21/2338* (2011.01)
*B60R 21/214* (2011.01)
(Continued)

(52) U.S. Cl.
CPC ........ *B60R 21/2338* (2013.01); *B60R 21/214* (2013.01); *B60R 21/232* (2013.01);
(Continued)

(58) Field of Classification Search
CPC .... B60R 2021/0009; B60R 2021/0023; B60R 2021/23153; B60R 2021/23161;
(Continued)

(56) References Cited

U.S. PATENT DOCUMENTS 3,836,168 A 9/1974 Nonaka et al.
6,113,134 A * 9/2000 Lim ........................ B60R 21/26
180/282

(Continued)

FOREIGN PATENT DOCUMENTS

KR 20120019622 3/2012

OTHER PUBLICATIONS

Translation of KR-20120019622-A, Kim, Mar. 7, 2012. (Year: 2012).*

*Primary Examiner* — Laura Freedman
(74) *Attorney, Agent, or Firm* — TAROLLI, SUNDHEIM, COVELL & TUMMINO L.L.P.

(57) ABSTRACT

A restraint system (10) for helping to protect an occupant (60) of a vehicle (20) having a roof (32) and a cabin (40) with a seat (50) for the occupant (60) includes an airbag (70) having a stored condition within the roof (32) and being inflatable to a deployed condition extending into the cabin (40) and aligned with the seat (50). First and second tethers (110, 120) each have a first end (112, 122) connected to the airbag and a second end (114, 124). A first retractor (140) is connected to the vehicle (20) and to the second end (114) of the first tether (110). A second retractor (150) is connected to the vehicle (20) and to the second end (124) of the second tether (120). The first and second retractors (140, 150) control the length of each of the first and second tethers (110, 120) when the airbag (60) is in the deployed condition.

10 Claims, 5 Drawing Sheets

(51) Int. Cl.
    *B60R 21/232*    (2011.01)
    *B60R 21/2342*    (2011.01)
    *B60R 21/00*    (2006.01)
    *B60R 21/231*    (2011.01)

(52) U.S. Cl.
    CPC ... *B60R 21/2342* (2013.01); *B60R 2021/0004* (2013.01); *B60R 2021/23107* (2013.01); *B60R 2021/23161* (2013.01); *B60R 2021/23382* (2013.01); *B60R 2021/23386* (2013.01)

(58) Field of Classification Search
    CPC ........... B60R 2021/23192; B60R 2021/23386; B60R 2021/23388; B60R 21/01516; B60R 21/214; B60R 21/232; B60R 21/2338
    See application file for complete search history.

(56) References Cited

U.S. PATENT DOCUMENTS

| | | | | |
|---|---|---|---|---|
| 6,616,184 B2* | 9/2003 | Fischer | ................ | B60R 21/233 280/743.2 |
| 6,709,010 B2* | 3/2004 | Dominissini | ....... | B60R 22/1953 280/730.2 |
| 6,722,691 B1* | 4/2004 | Håland | ................ | B60R 21/233 280/743.2 |
| 7,195,276 B2* | 3/2007 | Higuchi | ............... | B60R 21/231 280/743.1 |
| 7,997,374 B2* | 8/2011 | Eschbach | .......... | B60R 21/01516 180/268 |
| 9,327,669 B2* | 5/2016 | Jaradi | ..................... | B60R 21/08 |
| 9,676,361 B2* | 6/2017 | Smith | .................. | B60R 21/231 |
| 9,771,047 B2* | 9/2017 | Kruse | ................ | B60R 21/0136 |
| 9,994,182 B1* | 6/2018 | Jaradi | .................. | B60R 21/214 |
| 10,336,283 B2* | 7/2019 | Rickenbach | .......... | B60R 21/233 |
| 10,471,923 B2* | 11/2019 | Jimenez | ................ | B60R 21/231 |
| 10,589,708 B2* | 3/2020 | Cho | .................... | B60R 21/0136 |
| 10,960,839 B2* | 3/2021 | Imura | .................. | B60R 21/214 |
| 11,040,687 B2* | 6/2021 | Jayakar | ................ | B60R 21/214 |
| 11,059,449 B2* | 7/2021 | Jayakar | ................ | B60R 21/214 |
| 11,214,227 B2* | 1/2022 | Jayakar | ................ | B60R 21/232 |
| 11,279,311 B2* | 3/2022 | Schroeder | ............ | B60R 21/214 |
| 11,345,300 B2* | 5/2022 | Fischer | ................ | B60R 21/2338 |
| 11,351,949 B2* | 6/2022 | Fischer | ................ | B60R 21/216 |
| 11,458,922 B2* | 10/2022 | Fischer | ................ | B60R 21/231 |
| 11,479,203 B2* | 10/2022 | Jayakar | ................ | G02B 3/0006 |
| 2002/0158456 A1 | 10/2002 | Fischer | | |
| 2005/0001412 A1 | 1/2005 | Schneider et al. | | |
| 2006/0186656 A1 | 8/2006 | Kumagai | | |
| 2017/0113646 A1 | 4/2017 | Lee et al. | | |
| 2019/0161048 A1 | 5/2019 | Thomas et al. | | |
| 2019/0161049 A1 | 5/2019 | Thomas et al. | | |
| 2019/0248322 A1* | 8/2019 | Herzenstiel | .......... | B60R 21/207 |
| 2020/0391689 A1* | 12/2020 | Fischer | ................ | B60R 21/233 |
| 2020/0391691 A1* | 12/2020 | Fischer | ................ | B60R 21/207 |
| 2021/0114547 A1* | 4/2021 | Fischer | ................ | B60R 21/239 |

* cited by examiner

ROOF-MOUNTED OCCUPANT RESTRAINT SYSTEM

RELATED APPLICATIONS

This application claims the benefit of U.S. Provisional Appln. No. 62/661,667, filed Apr. 24, 2018, the entirety of which is incorporated by reference herein.

TECHNICAL FIELD

The present invention relates generally to vehicle airbags and, in particular, relates to a roof-mounted airbag with tethers.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a module that is mounted to the vehicle instrument panel. An airbag door is connectable with the module and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a module that is mounted on the vehicle steering wheel. An airbag cover is connectable with the module and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one example, a restraint system for helping to protect an occupant of a vehicle having a roof and a cabin with a seat for the occupant includes an airbag having a stored condition within the roof and being inflatable to a deployed condition extending into the cabin and aligned with the seat. First and second tethers each have a first end connected to the airbag and a second end. A first retractor is connected to the vehicle and to the second end of the first tether. A second retractor is connected to the vehicle and to the second end of the second tether. The first and second retractors control the length of each of the first and second tethers when the airbag is in the deployed condition.

In another example, a restraint system for helping to protect an occupant of a vehicle having a roof and a cabin with a seat for the occupant includes an airbag having a stored condition within the roof and being inflatable to a deployed condition extending into the cabin and aligned with the seat. A weight sensor detects a weight of the occupant in the seat. First and second tethers each have a first end connected to the airbag and a second end. An inboard retractor is connected to the vehicle and to the second end of the first tether. An outboard retractor is connected to the vehicle and to the second end of the second tether. A controller, in response to the detected weight, actuates the inboard and outboard retracts to control the length of each of the first and second tethers when the airbag is in the deployed condition.

Other objects and advantages and a fuller understanding of the invention will be had from the following detailed description and the accompanying drawings.

DETAILED DESCRIPTION

Figure 1:
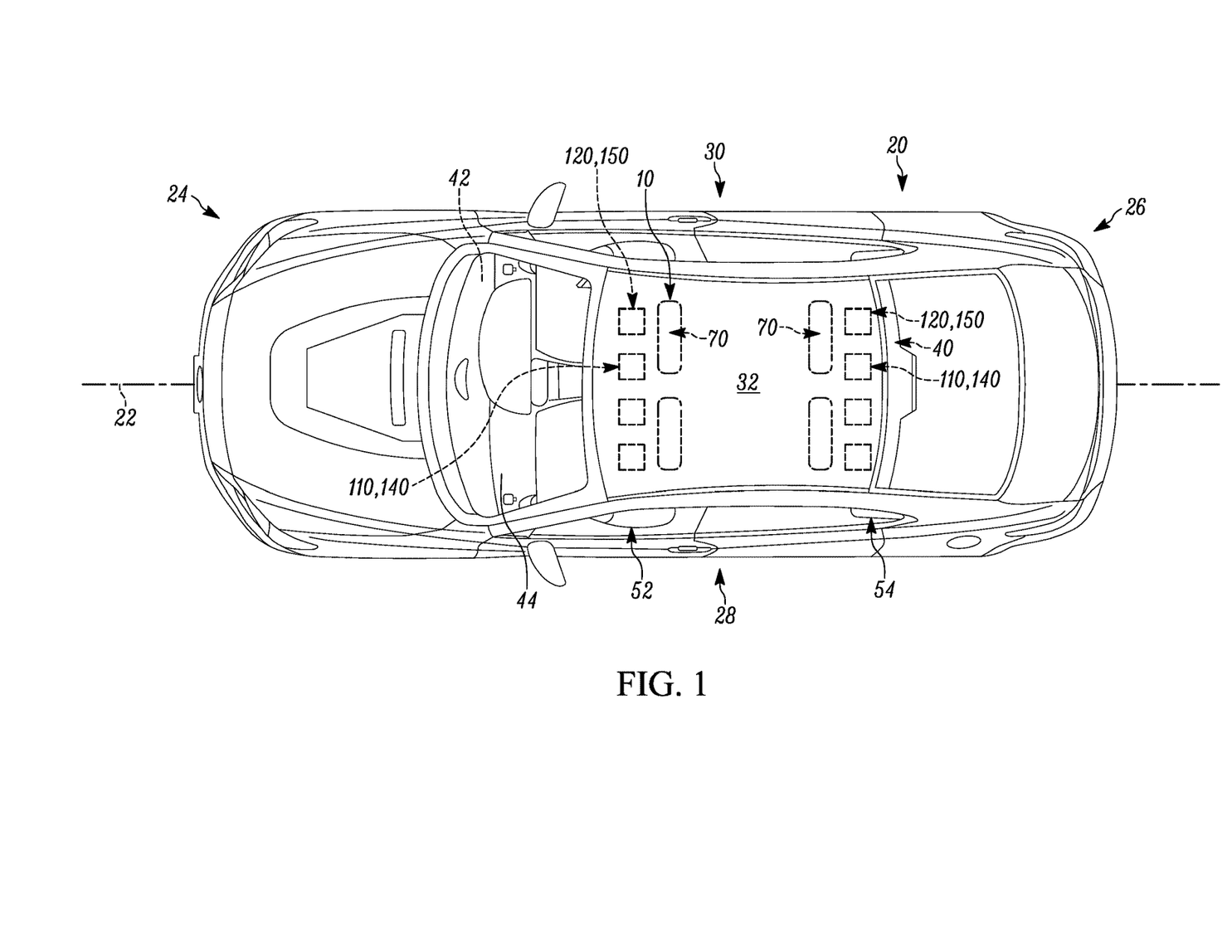
FIG. 1 is a top view of a vehicle including an example roof-mounted, occupant restraint system.
Figure 2:
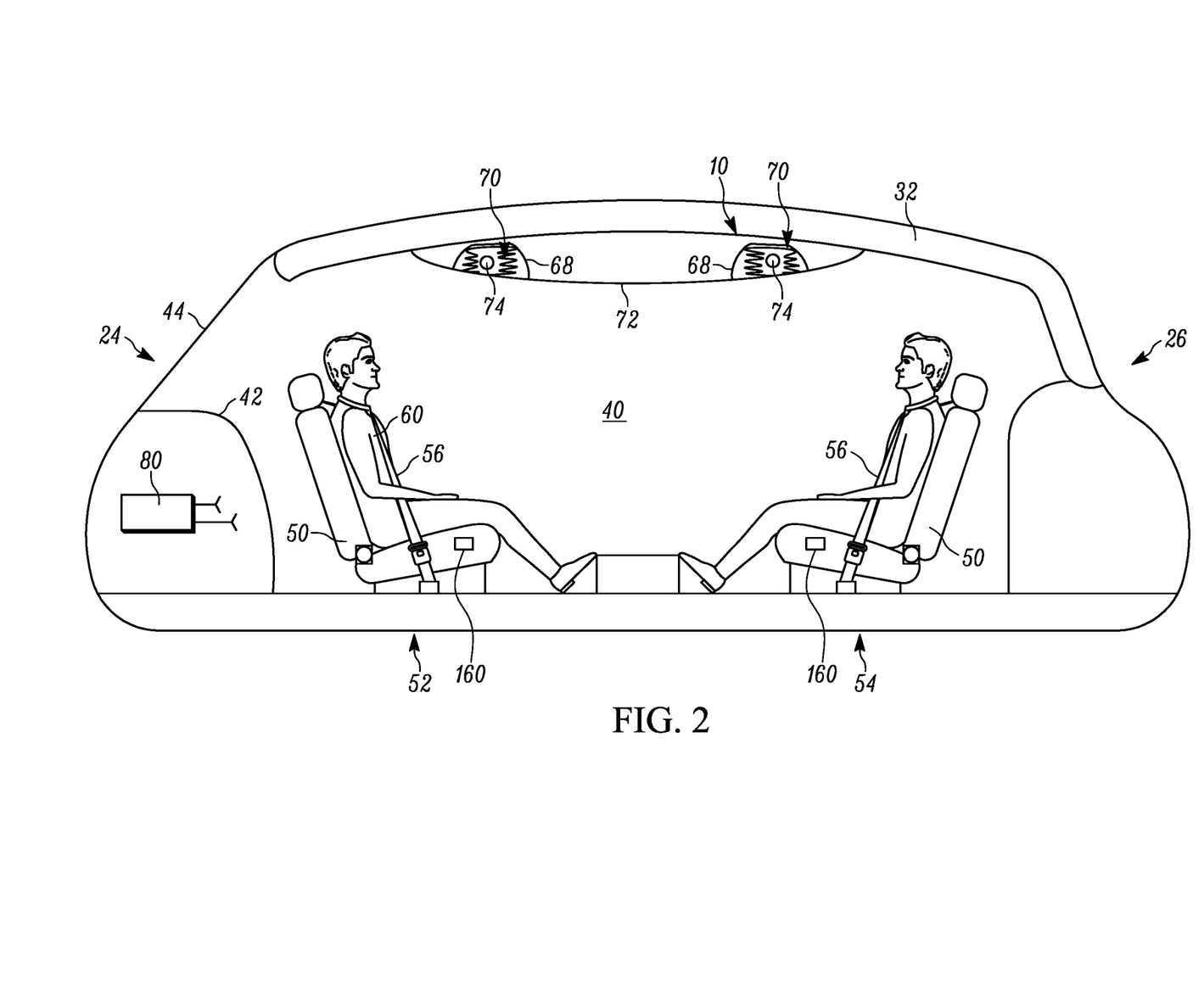
FIG. 2 is a schematic illustration of a cabin of the vehicle with an airbag of the occupant restraint system in a stored condition.

The present invention relates generally to vehicle airbags and, in particular, relates to a roof-mounted airbag with tethers. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 is fitted with a seatbelt 56 for restraining its occupant 60. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one airbag module 68 for placement along the roof 32 of the vehicle 20. Each airbag module 68 includes at least one vehicle occupant protection device in the form of an inflatable curtain airbag 70 and an inflator 74 for providing inflation fluid to the airbag. Mounting the airbag module 68 in the vehicle roof 32 is convenient because the airbags 70 can be positioned in a location with a desired proximity to the occupants 60 they are intended to help protect. This can help reduce the necessary inflatable volume of the airbags 70 and can also help provide a desired airbag deployment time without requiring an excessively high-volume inflator.

The airbag modules 68 are housed/concealed in the roof structure of the vehicle 20 behind, for example, a roof liner 72. The airbag 70 is at least one of rolled and folded within the airbag module 68 before being placed behind the roof liner 72. The inflator 74 is operatively connected (e.g., by wires) to an airbag controller 80 (see FIG. 2) that includes or communicates with one or more crash sensors (not shown). The controller 80 is operative to determine the occurrence of a crash event (e.g., front, rear, side, oblique, etc.) and to actuate the inflator 74 in a known manner to inflate the airbag 70. The inflator 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbag modules 68 provided along the roof 32 and within the roof liner 72 at locations associated and aligned with each seat 50 in each row 52, 54. In other words, each seat 50 in the vehicle 20 can have an individual airbag module 68 and, thus, each seat can have an individual airbag 70 associated and aligned therewith. In each case, the airbag 70 is positioned in front of the associated seat 50 in each row 52, 54 in the direction the occupants 60 in those seats would face (i.e., rearward of the front row 52 and forward of the rear row 54).

The airbags 70 extend in the left-to-right direction of the vehicle 20 generally parallel to the width of the seats 50. Alternatively, a single airbag 70 can span the entire width of the cabin 40 to protect all the occupants 60 in an entire row 52 or 54 (not shown). In the example shown in FIG. 2, airbags 70 are provided behind the roof liner 72 and associated with a seat 50 in each row 52, 54. The airbag modules 68 are identical and, thus, the construction and operation of only the airbag module associated with a seat 50 in the rear row 54 is discussed for brevity.

Figure 3:
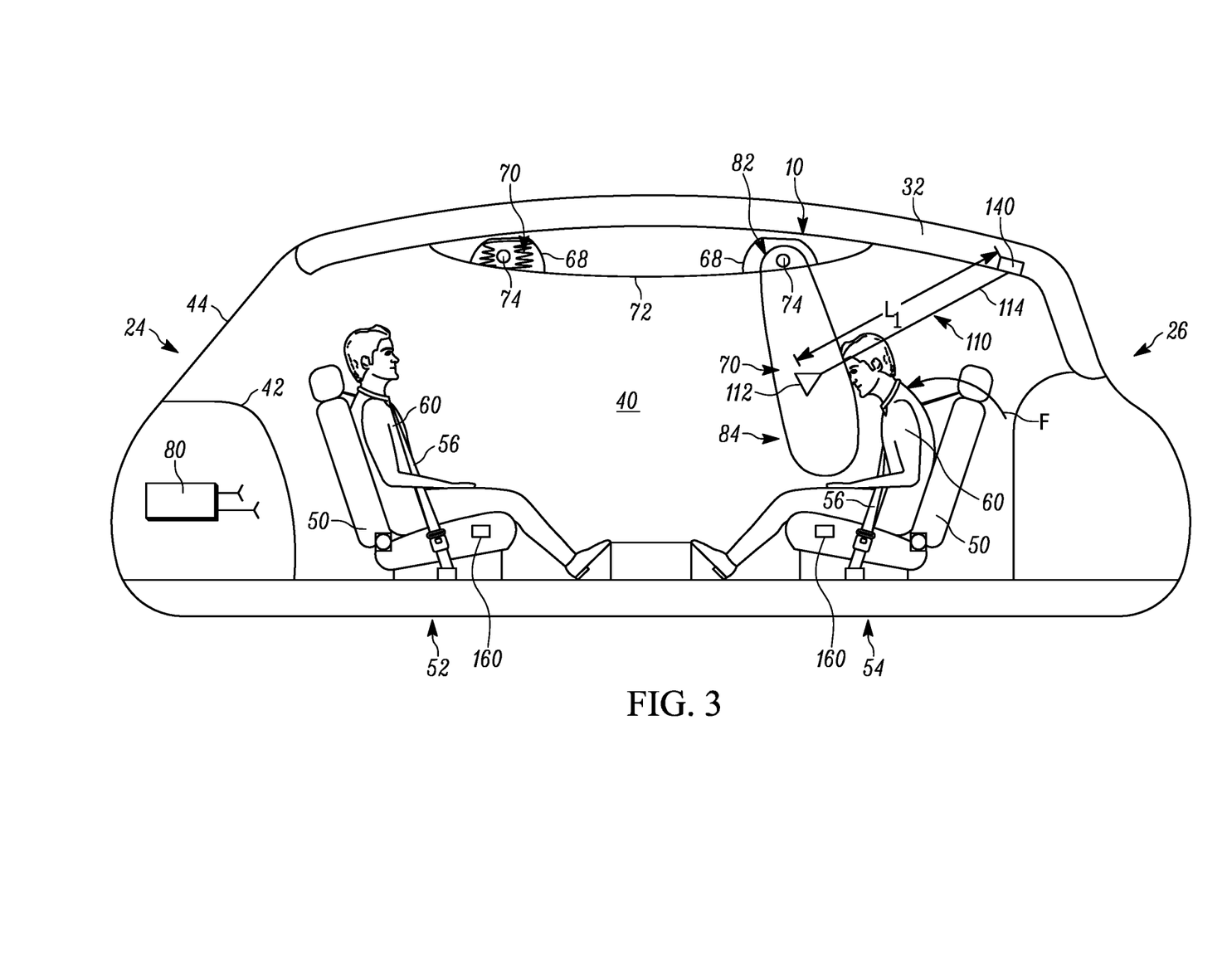
FIG. 3 is a schematic illustration of the cabin of the vehicle with the airbag in a deployed condition.

As shown in FIG. 3, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner.

The inflating airbag 70 exerts a force on the roof liner 72, which causes the roof liner to open. This releases the airbag 70 to inflate and deploy from its stored condition behind the roof liner 72 to a deployed condition extending into the cabin 40 forward of and aligned with a seat 50 in the rear row 54. The airbag 70, while inflated, helps protect the vehicle occupant 60 in the rear row 54 by absorbing the impact of the occupant.

The inflated airbag 70, when deployed, extends from an upper end 82 to a lower end 84. The upper end 82 is connected to the vehicle 20 and fluidly connected to the inflator 74. The lower end 84 is positioned adjacent an occupant 60 in the seat 50 in the rear row 54. The lower end 84 can be spaced from the lap/lower torso of the occupant 60 (as shown) or engage the occupant's lap/lower torso (not shown).

As noted, there is no vehicle structure in position to act as a reaction surface to constrain movement of the deployed airbag 70. Consequently, the occupant restraint system 10 includes tethers 110, 120 (see also FIG. 1) associated with each airbag 70 and extending from each airbag to locations adjacent to or at the roof 32. Each tether 110 is formed from a single piece of inextensible material and extends from a first end 112 connected to the lower end 84 of the airbag 70 and a second end 114 positioned adjacent the roof 32. The first end 112 can be formed as a stress reducer for spreading the connection between the tether 110 and the airbag 70 over a larger surface area of the airbag fabric so as to prevent tearing.

Each tether 120 (see also FIG. 5) is formed from a single piece of inextensible material and extends from a first end 122 connected to the lower end 84 of the airbag 70 and a second end 124 positioned adjacent the roof 32. The first end 122 can be formed as a stress reducer for spreading the connection between the tether 120 and the airbag 70 over a larger surface area of the airbag fabric so as to prevent tearing.

A first retractor 140 is secured to the roof 32 and connected to the second end 114 of the first tether 110. A second retractor 150 (FIG. 1) is secured to the roof 32 and connected to the second end 124 of the second tether 120. Both retractors 140, 150 are connected to the controller 80 and can be actuated thereby.

As shown in FIG. 1, the tethers 110, 120 and respective retractors 140, 150 are positioned on opposite sides of the airbag 70, namely, the inboard and outboard sides of each airbag. The tethers 110, 120 associated with the airbags 70 adjacent each rear row 54 are connected via the retractors 140, 150 to the roof 32 at locations rearward of the occupant-facing portion of the airbag. Because the occupant 60 is belted, a frontal crash resulting in forward occupant movement causes the occupant to bend at the waist and follow an angled or arcuate path toward the airbag 70, as indicated generally by the arrow F in FIG. 3. Advantageously, as shown in FIG. 3, the locations of the retractors 140, 150 (where the second ends 114, 124 connect to the roof 32) can be selected such that the tethers 110, 120 extend in directions or along paths that approximate or coincide with (i.e., lies substantially parallel to or coextensive with) the path along which the occupant 60 travels into contact with the airbag 70.

In this manner, the tension force in the tethers 110, 120 that apply to the airbag 70 can oppose the impact forces applied to the airbag by the penetrating occupant 60. As a result, the roof 32, through the tethers 110,120 and retractors 140, 150, acts as the reaction surface for the airbag 70. The example configuration of FIG. 3 therefore requires no interaction with forward structure of the vehicle 20, such as an instrument panel, steering wheel or seat, to provide a reaction surface for the airbag.

With this in mind, the retractors 140, 150 can cooperate with the controller 80 to control or adjust the lengths of the tethers 110, 120 prior to and during deployment of the airbag 70 as well as during occupant 60 penetration into the airbag. To this end, a portion of each tether 110, 120 can be spooled on the respective retractor 140, 150 prior to deployment of the airbag 70. Furthermore, a weight sensor 160 (FIG. 3) can be positioned in or on each seat 50 for detecting the weight of the occupant 60 therein. Each weight sensor 160 sends a signal indicative of the weight of the occupant 60 in that particular seat 50 to the controller 80.

When the airbag 70 deploys but prior to occupant 60 penetration (FIG. 3), the retractors 140, 150 can release or unspool a portion of each tether 110, 120 such that each tether is taught and has a predetermined first length $L_1$. The first length $L_1$ can be selected to position the deployed airbag 70 in a prescribed orientation (e.g., angle and/or distance) relative to the occupant 60.

Figure 4:
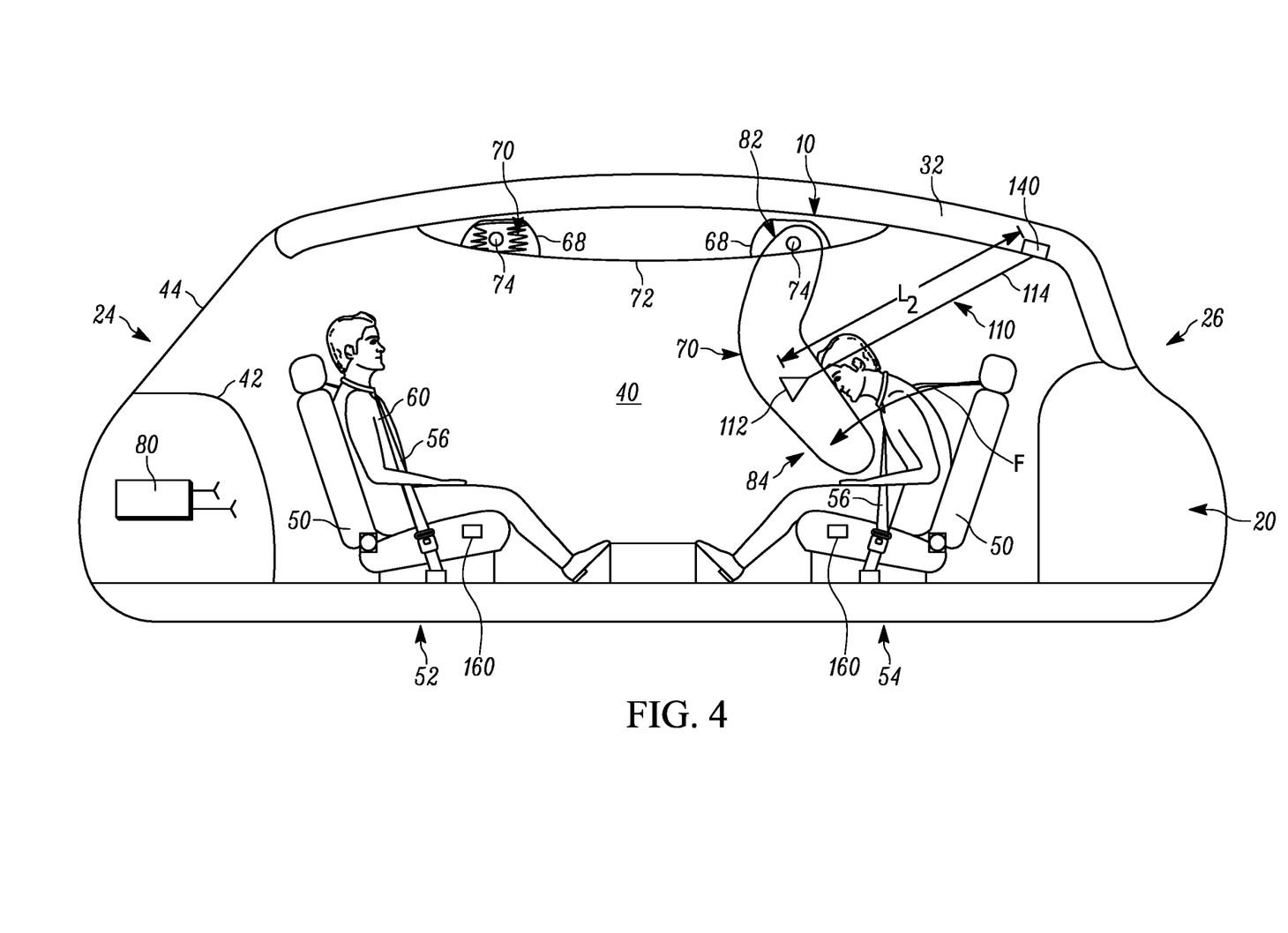
FIG. 4 is a schematic illustration of the occupant restraint system of FIG. 3 following occupant penetration into the airbag.

In any case, the tethers 110, 120 maintain the lower end 84 of the airbag 70 in the position shown to prevent swinging/pivoting of the airbag about the inflator 74 when the airbag is penetrated by the occupant 60. The occupant 60 moves in the path F and ultimately impacts and penetrates the inflated and deployed airbag 70, as shown in FIG. 4. The retractors 140, 150 can be configured to adjust the length of the tethers 110, 120 as the occupant 60 penetrates the airbag 70 based on the occupant's size. More specifically, the controller 80, in response to signals received from the weight sensor 160, can actuate the retractors 140, 150 to release or unspool the tethers 110, 120 until the tethers have a second length $L_2$ longer than the first length $L_1$.

Due to this configuration, the occupant 60 is permitted to ride down the airbag 70 and experience a more gradual reaction with the airbag while the tethers 110, 120 and roof 32 provide a reaction surface for the deployed, moving airbag. In other words, providing an airbag 70 with tethers 110, 120 that lengthen via the retractors 140, 150 during occupant 60 penetration advantageously allows for a gradual slowdown of the penetrating occupant into the airbag in a prescribed manner. To this end, the difference between the first and second lengths $L_1$, $L_2$ will increase with the size of the occupant 60.

A smaller occupant 60 will impact the airbag 70 with relatively less force and therefore need less of a ride-down effect (i.e., less lengthening of the tethers 110, 120 during occupant penetration). On the other hand, a larger occupant 60 will impact the airbag 70 with relatively more force and therefore need more of a ride-down effect (i.e., more lengthening of the tethers 110, 120 during occupant penetration). In each case, the retractors 140, 150 not only dictate the first length $L_1$ of the tethers 110, 120 to position the deployed airbag 70 in a desired position relative to the occupant 60 but also dictate the second, longer length $L_2$ based on the detected occupant 60 size.

Figure 5:
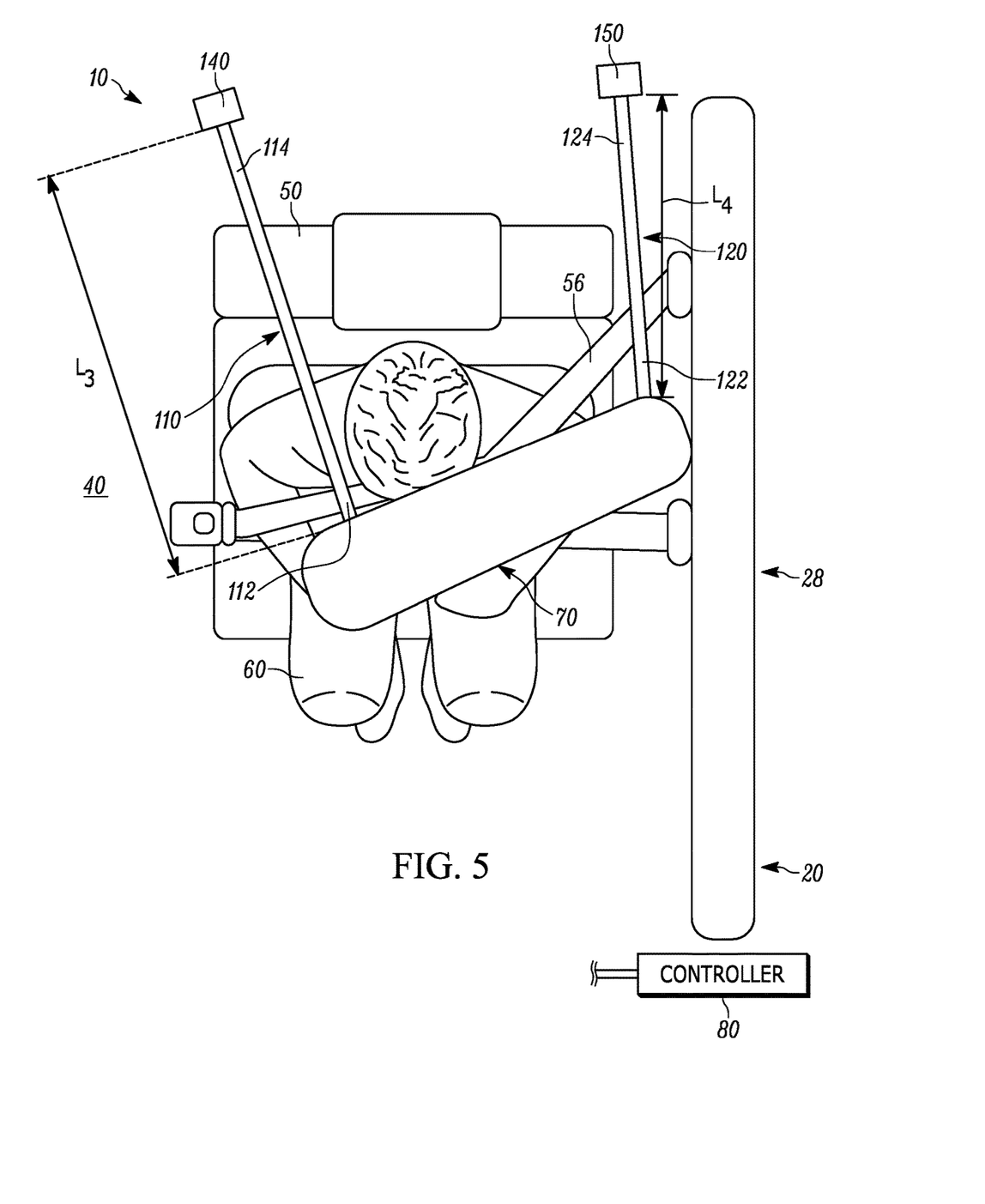
FIG. 5 is a schematic illustration of the cabin of the vehicle with the airbag in another deployed condition.

In another example shown in FIG. 5, the tethers 110, 120 have different lengths when the airbag 70 is deployed. This can occur, for example, when the vehicle crash is oblique. When the controller 80 determines an oblique crash has occurred, the controller actuates the retractors 140, 150 such that the airbag 70 is deployed asymmetrically within the vehicle 20 (e.g., extends at an angle relative to the inboard-outboard direction of the vehicle). In one instance when the occupant 60 is closer to the left side 28 of the vehicle 20, the inboard retractor 140 releases more of the first tether 110 than the outboard retractor 150 releases of the second tether 120. The first tether 110 therefore has a length $L_3$ greater than a length $L_4$ of the second tether 120. As a result, the inboard side of the airbag 70 is more forward in the vehicle 20 than the outboard side of the airbag.

Alternatively, if the occupant 60 is closer to the right side 30 of the vehicle 20 (not shown), the inboard retractor 140 releases less of the first tether 110 than the outboard retractor 150 releases of the second tether 120. The first tether 110 therefore has the length $L_4$ less than the length $L_3$ of the second tether 120. As a result, the outboard side of the airbag 70 is more forward in the vehicle 20 than the inboard side of the airbag. In both cases, the retractors 140, 150 subsequently cooperate with the controller 80 and weight sensor 160 to control the ride down effect on the occupant 60 into the airbag 70 by allowing the tethers 110, 120 to lengthen in a prescribed manner during occupant penetration.

Although the descriptions of the airbags 70 and the tethers 110, 120 above are directed to the rear row 54 of seats 50, it will be appreciated that the same airbags and tethers can be provided for the front row 52 of seats (see FIGS. 1-2). Since the seats 50 in the rows 52, 54 face in opposite directions, the purposes of their respective airbags 70 differ from each other. In the event of a frontal vehicle crash, the rearward-facing seats 50 in the front row 52 will help protect their occupants 60 by absorbing the impact of the occupants. The airbags 70 of the forward-facing rear seats 50 in the rear row 54 will help protect their occupants 60 by absorbing the impact energy of the occupants.

In the event of a rear vehicle crash, the seatbacks of the forward-facing seats 50 in the rear row 54 will help protect their occupants 60 by absorbing the impact with the occupants. The airbags 70 of the rearward-facing seats 50 in the front row 52 will help protect their occupants 60 by absorbing the impact energy of the occupants.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin with a seat for the occupant, comprising:
   an airbag having a pre-deployment condition in which the airbag is deflated and stored in the roof, the airbag being inflatable from the stored condition to a deployed condition extending downward from the roof into the cabin in front of the seat;
   first and second retractors mounted in the roof rearward of the seat, the first retractor being positioned on an inboard side of the seat, the second retractor being positioned on an outboard side of the seat;
   a first tether having a first end connected to an inboard side of the airbag and a second end connected to the first retractor, and a second tether having a first end connected to an outboard side of the airbag and a second end connected to the second retractor, wherein, in the pre-deployment condition, the first tether is wound onto the first retractor and the second tether is wound onto the second retractor;
   a seat weight sensor configured to measure a weight of the occupant on the seat; and
   a controller configured to control inflation of the airbag and the operation of the first and second retractors, wherein the controller is operatively connected to the seat weight sensor and is configured to actuate the first and second retractors to release the first and second tethers to unspool from the first and second retractors under tension applied by the inflating airbag in response to airbag deployment and a sensed weight of the occupant determined via the seat weight sensor, to control the first and second retractors to control the unspooling of the first and second tethers to limit the deployed position of the airbag prior to occupant impact with the airbag in response to the sensed weight of the occupant, and to control unspooling of the first and second tethers after occupant impact with the airbag to control occupant ride-down in response to the sensed weight of the occupant.

2. The restraint system recited in claim 1, wherein the controller is configured to control unspooling of the first and second tethers so that the tethers have first lengths controlling the deployed position of the airbag, and second lengths, longer than the first lengths after occupant impact with the airbag, wherein the controller is configured to determine the second lengths in response to the sensed weight of the occupant.

3. The restraint system recited in claim 1, wherein the controller is further configured to control unspooling of the first and second tethers in response to sensed vehicle conditions.

4. The restraint system recited in claim 3, wherein the sensed conditions comprise a sensed crash type.

5. The restraint system recited in claim 4, wherein the controller is configured to control the first and second retractors to unspool lengths of the first and second tethers after occupant impact in response to a sensed oblique crash so that the unspooled length of one of the first and second tethers is longer than the other of the first and second tethers.

6. The restraint system recited in claim 1, further comprising a seat weight sensor operatively connected to the controller, wherein the controller is configured to determine the sensed weight on the vehicle seat in response to a signal obtained from the seat weight sensor.

7. The restraint system recited in claim 1, wherein the controller is configured to control the first and second retractors to unspool lengths of the first and second tethers after occupant impact that increase with the sensed weight on the vehicle seat.

8. The restraint system recited in claim 1, wherein the first retractor is mounted adjacent a centerline of the vehicle.

9. The restraint system recited in claim 1, wherein the system is configured to help protect an occupant of a single seat in the vehicle.

10. The restraint system recited in claim 1, wherein the first and second tethers are configured to become tensioned in response to occupant impact, and wherein the controller is configured to control unspooling of the first and second tethers after occupant impact with the airbag to control occupant ride-down by controlling the tension on the first and second tethers.

* * * * *